D. J. BOWEN.
FEED BAG.
APPLICATION FILED NOV. 11, 1914.
1,154,229.
Patented Sept. 21, 1915.
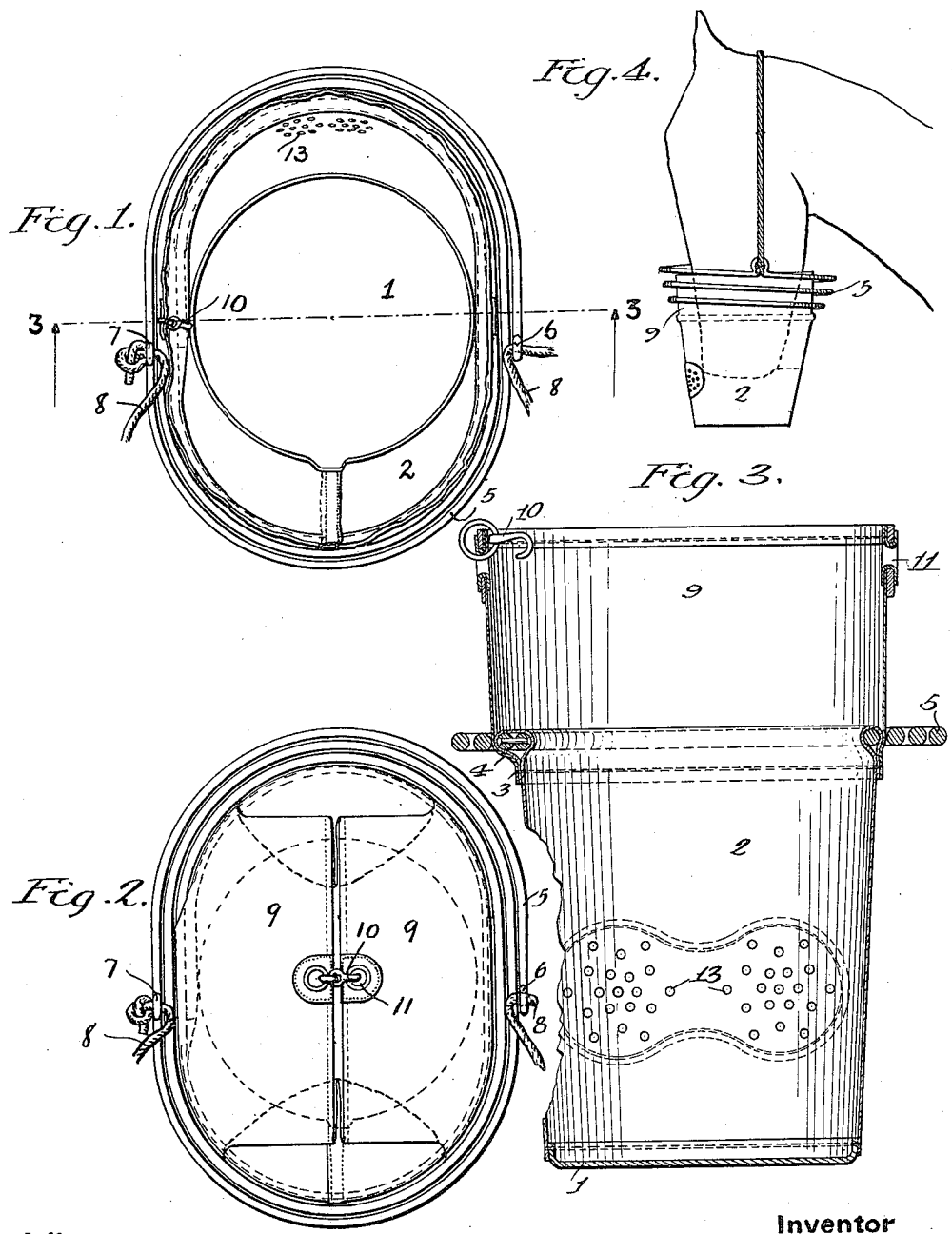

UNITED STATES PATENT OFFICE.

DAVID J. BOWEN, OF BROOKLYN, NEW YORK, ASSIGNOR OF ONE-HALF TO GEORGE BONAWITZ, OF BROOKLYN, NEW YORK.

FEED-BAG.

1,154,229. Specification of Letters Patent. Patented Sept. 21, 1915.

Application filed November 11, 1914. Serial No. 871,476.

*To all whom it may concern:*

Be it known that I, DAVID J. BOWEN, a citizen of the United States, and a resident of Brooklyn, in the county of Kings and State of New York, have invented a new and useful Feed-Bag, of which the following is a specification.

My invention relates especially to a bag which can be attached to a horse's head, for feeding purposes. It is designed especially to prevent the spilling and consequent waste of grain and at the same time it affords a strong, serviceable bag which is not easily damaged by use.

Reference is made to the accompanying drawings, in which—

Figure 1 is a plan; Fig. 2 is a plan with the top closed; Fig. 3 is a sectional elevation on the line 3—3 of Fig. 1; Fig. 4 shows, in elevation, the manner of attachment to a horse's head, with the spring opened up and Fig. 5 shows in diagrammatic elevation, the compass or space occupied by an empty collapsed bag.

The bag comprises a bottom portion 1, which is preferably circular in form and made of some tough, stiff material as leather and a side portion 2, which is preferably made of a flexible fabric such as canvas. This constitutes the bag proper and is not unlike the ordinary feed bag in common use. The upper edge is turned over and held by stitches 3, forming a hem 4. Into this hem is inserted the inner coil of a spiral spring 5. This spring is coiled so as to normally lie in a single plane and is preferably flattened into a somewhat elliptical form, so as to conform to the shape of a horse's head when the bag is in feeding position. The outer or free end of the spring is formed into an eye 6 and directly opposite on the same coil of the spring another eye 7 is formed. These are for the attachment of a cord 8, by means of which the bag is held in position for feeding, as shown in Fig. 4.

The bag has also a cover portion 9 which is sewed to the top of the bag proper. The is provided with a snap hook 10 on one side which is adapted to engage with an eye 11 on the opposite side, thereby closing the top of the bag, as shown in Fig. 2, so that it may be carried full of grain without danger of spilling.

The bag is also provided with the usual ventilating perforations 13.

It is obvious from the construction shown that the tension of the spring can be adjusted or made so that it will keep the horse's mouth in the grain until the last particle is consumed and he can therefore finish the full feed with his head in an upright position. The spring having several coils can be made of spring wire of a diameter sufficient to give it great strength so that it will not be easily damaged and at the same time any desired spring tension may be secured.

The spring is formed by spirally winding a wire around an approximate ellipse and normally assumes its original, flat position. When extended, as shown in Fig. 4, it assumes a helical form, as though wound around a frustum of an elliptical cone. This construction permits the bag to be folded or collapsed into very small space which is not easily damaged by rough usage.

Having now described my invention, what I claim is:

1. A feed bag, in combination with a plane spiral spring the inner coil of said spring being secured to the top of said bag and supporting means secured to the outer coil of said spring.

2. A feed bag of flexible fabric having a hem at the top edge thereof, in combination with a plane spiral spring the inner coil of which is secured in said hem and the outer coil of which is provided with diametrically opposite eyes.

3. A feed bag comprising, in combination, the bag proper with a bottom; a side portion with a hem; a plane spiral spring the inner coil of which is inserted in said hem and the outer coil of which is provided with eyes; and an extending side portion secured to the top of the bag proper which is adapted to be folded together as a cover and a snap catch connection for securing said cover portion together.

In testimony whereof I affix my signature in presence of two witnesses.

DAVID J. BOWEN.

Witnesses:
I. M. HENDERSON,
HENRY F. ZOBLE.

Copies of this patent may be obtained for five cents each, by addressing the "Commissioner of Patents, Washington, D. C."